United States Patent [19]

Streeter

[11] Patent Number: 4,797,591
[45] Date of Patent: Jan. 10, 1989

[54] LINK SUSPENSION FOR A ROTOR MEMBER

[76] Inventor: Edward C. Streeter, 89 Park Place, Harrogate, N. Yorkshire, England, HG1 5NS

[21] Appl. No.: 927,067

[22] Filed: Nov. 5, 1986

Related U.S. Application Data

[63] Continuation-in-part of Ser. No. 425,417, Sep. 28, 1982, Pat. No. 4,754,182.

[51] Int. Cl.$^4$ .............................................. H02K 49/06
[52] U.S. Cl. .................................................... 310/103
[58] Field of Search ................... 310/80, 89, 103, 104, 310/93

[56] References Cited

U.S. PATENT DOCUMENTS 4,167,848 9/1979 Kitai et al. ...................... 310/103 X
4,593,218 6/1986 Streeter ............................... 310/103

Primary Examiner—Donovan F. Duggan
Assistant Examiner—Judson H. Jones
Attorney, Agent, or Firm—Hoffmann & Baron

[57] ABSTRACT

A link suspension permitting limited rotation of a rotor in response to a magnetic control field uses a permanent magnet and support means having two contacting narrow concave curvilinear surfaces.

3 Claims, 4 Drawing Sheets

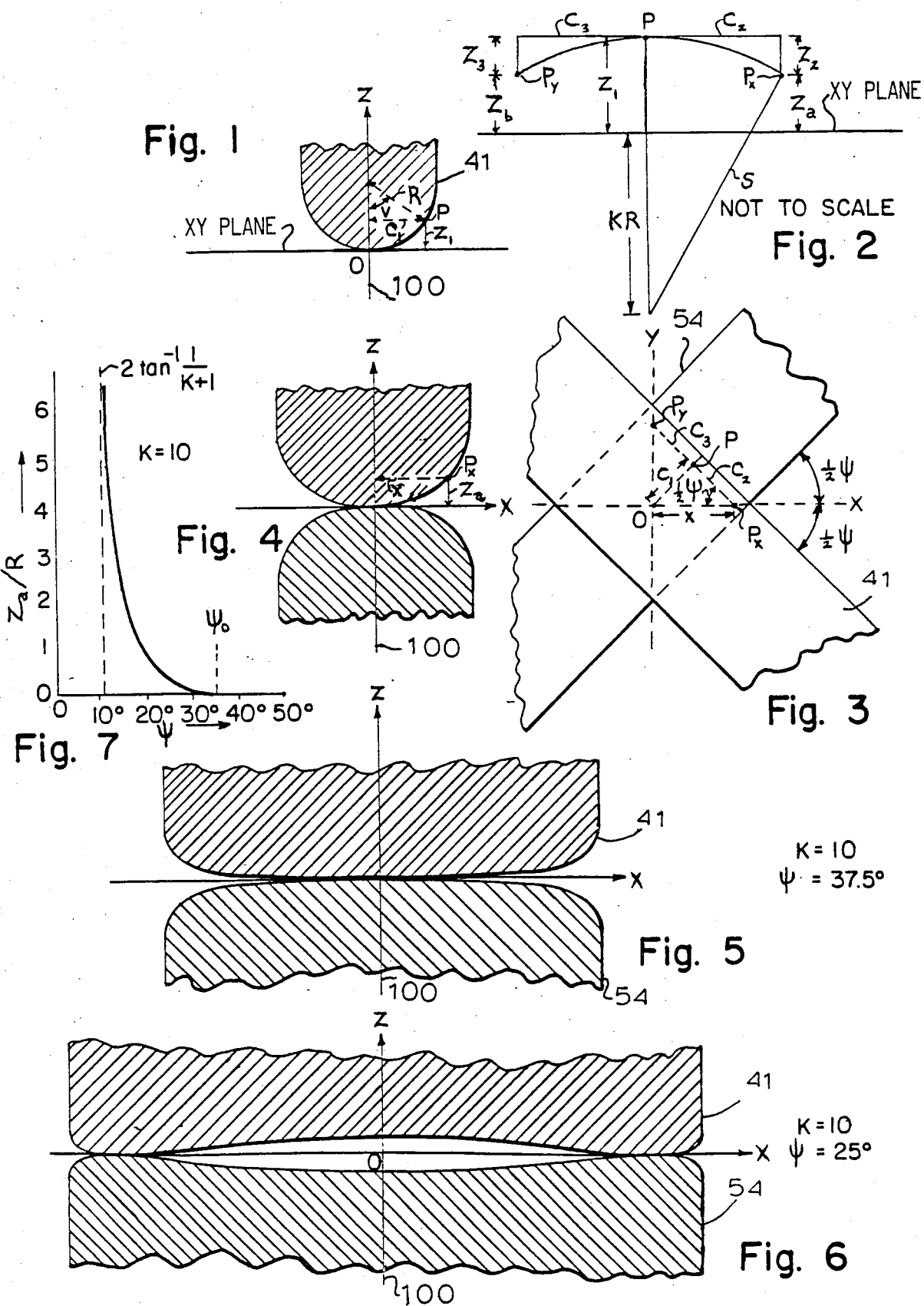

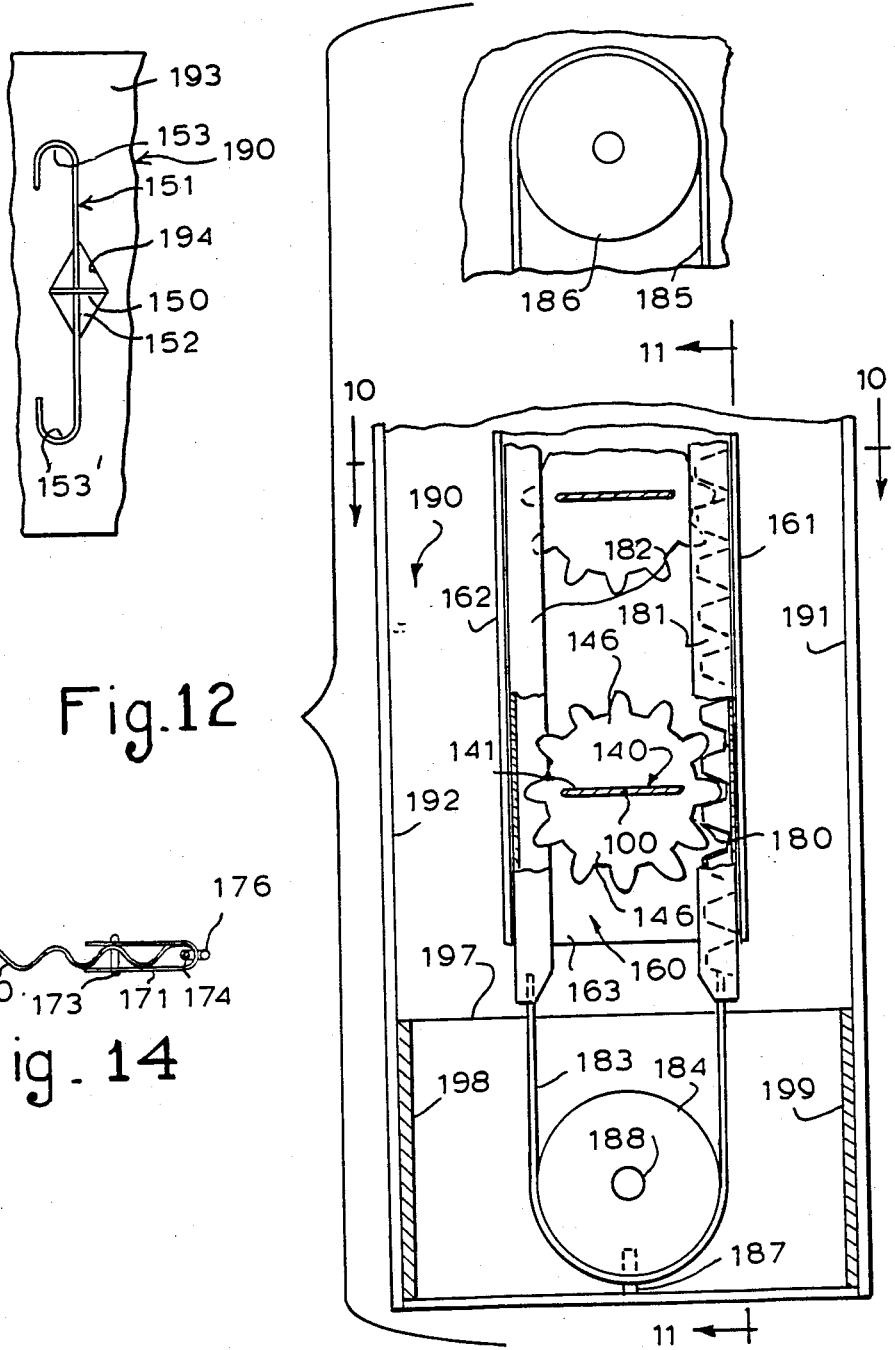
Fig. 13
Fig. 12
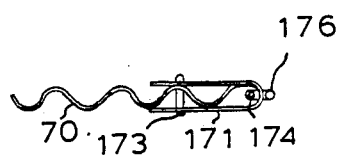
Fig. 14

LINK SUSPENSION FOR A ROTOR MEMBER

RELATED APPLICATIONS

This application is a continuation-in-part of application Ser. No. 06/425,417, filed Sept. 28, 1982, now U.S. Pat. No. 4,754,182. Attention is also directed to applicant's U.S. Pat. No. 4,593,218 granted June 3, 1986.

BACKGROUND OF THE INVENTION

1. Field of the Invention

This invention concerns suspensions permitting limited turning of a rotor member that is held under tension and subjected to a controlling torque.

The primary object of the invention is to provide inexpensive suspensions permitting adjustment of the attitudes of a plurality of longitudinally tensioned louvers about transversely spaced parallel coplanar axes.

2. Description of the Prior Art

Applicant's U.S. Pat. No. 3,742,648 discloses a link suspension for an array of adjustable louvers in which pivot pins are received in concave dimples to reduce frictional torque. The prior art is rich in such pivot designs wherein a synclastic convex bearing surface is opposed by a synclastic concave bearing surface.

An example of an anticlastic surface is the inside of a ring or chain link formed from a rod of circular cross section. Here the surface adjacent a given point on the inner periphery curves concavely along a longitudinal plane section and convexly along the perpendicular section.

Common experience with chains teaches that despite the facility of adjacent links to assume large angles relative to each other in orthogonal planes, links that are under tension repose with the planes that contain their narrow dimensions mutually perpendicular and resist twisting with a mechanical restoring torque that increases rapidly as the angle of torsion between the links increases.

SUMMARY OF THE INVENTION

It is therefore unexpected that linked members can serve as a self-aligning sensitive rotational suspension offering low frictional torque. We will show that if the ratio of the radii of concavity of the contacting surfaces is sufficiently large relative to the radii of convexity of the surfaces, no mechanical restoring torque exists over a useful range of rotational angles. Frictional torque can be limited by reducing the angle of rotation, a second link being provided to permit ±90 degrees of total angular movement.

A louver that is suspended from its ends is always under tension, is turned relatively infrequently, and is inherently restricted in angular range. An anticlastic suspension requires continuous tension, is subject to frictional wear, and is limited in rotational movement. These characteristics of louver and suspension are well matched and provide a cost effective synergetic combination.

Accordingly, the present invention is embodied in a link suspension permitting limited rotation of a rotor in response to a control torque, comprising a supporting member having an anticlastic supporting surface, a rotor armature having an anticlastic supported surface, torque coupling means fixed to said armature, and a louver connected under tension to said armature and holding said surfaces in contact, the radius of convexity of each of said surfaces being at least an order of magnitude smaller than the radius of concavity of the respective surface.

The rotor armature may conveniently be lamellar, such as a thin plate, and the supported surface may then be provided by a rounded periphery of a hole adjacent an edge of the plate. The edge of the hole is preferably fully rounded to produce a shape adjacent the axis of rotation generally similar to the inner circumferential half of a torus having a roughly semicircular cross section with a radius equal to half the thickness of the armature. This configuration can be easily achieved by shot-peening a punched hole.

The desired ratio of radii is achieved by employing as thin material as practicable since large radii of concavity decrease the accuracy with which the rotor armature is centered on its axis of rotation. Thus, the area of contact between the supporting surface and the supported surface is very small when the convex dimensions of the two surfaces are perpendicular, and the area is determined primarily by the allowable maximum contact pressure and the moduli of elasticity of the materials.

The supporting member may be a loop of fine wire or, like the rotor armature, comprise a thin metal plate having a hole therein and either fixed or rotatably coupled to a frame. The holes may conveniently be circular.

BRIEF DESCRIPTION OF THE DRAWINGS

FIG. 1 is a greatly enlarged detail of a cross section of a rotor armature parallel to its thickness dimension at the point of contact with a supporting surface.

FIG. 2 is a diagram illustrating the geometrical relationship of mathematical terms.

FIG. 3 is a detail on the same scale as FIG. 1 of the the rotor armature and supporting surface viewed parallel to the axis of rotation, showing the line of symmetry along which contact is made, and illustrating the geometrical relationship of further terms.

FIG. 4 is a detail on the same scale as FIG. 1 of a section of the two contacting bodies taken along the line of symmetry of FIG. 3 and revealing the outline of the surfaces corresponding to an angle $\psi=90°$ between planes containing equal principal curvatures of the supporting and supported surfaces.

FIG. 5 is a detail on the same scale as FIG. 1 of the outline of the contacting surfaces corresponding to $\psi=37.5°$.

FIG. 6 is a detail on the same scale as FIG. 1 of the outline of the contacting surfaces corresponding to $\psi=25°$, showing separation of the opposed surfaces on the axis of rotation and thereby revealing the presence of a mechanical restoring torque.

FIG. 7 is a graph of the curve $z/R = f(\psi)$, which has a slope proportional to the mechanical restoring torque.

FIG. 12 is an elevation of the beam with rotor armatures, spur gears and rack viewed from the point indicated by arrows 12—12 of FIG. 11.

FIG. 13 shows a toggle fastener that provides an anticlastic supporting surface seen from a viewpoint indicated by arrows 13—13 of FIG. 10.

FIG. 14 is an edge view of a longitudinally resilient louver and end fitting suitable for tensioning the rotor of FIG. 10.

BASIC THEORY OF OPERATION

Figure 8A:
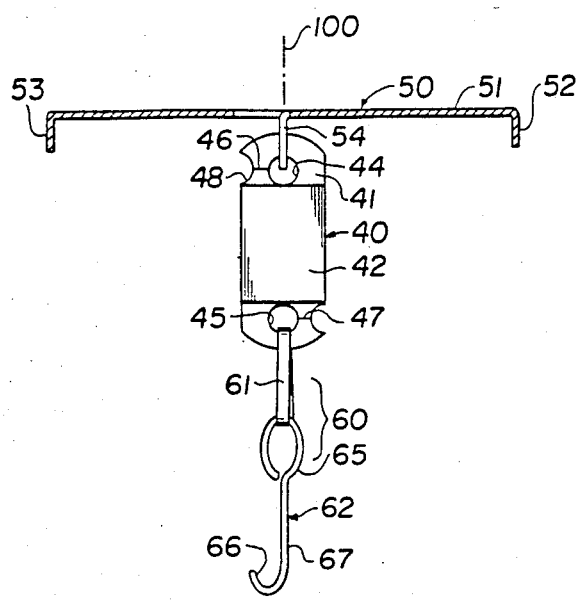
FIG. 8A is a view of a link suspension according to the invention showing a rotor armature supported from a beam cover plate, which is adapted to nest on the beam of FIG. 8B.

Needless mathematical complexity is avoided by assuming that the shape of the contacting suspension surfaces and the moduli of elasticity E of the supporting and supported bodies are identical. The principal radii of curvature in orthogonal planes of one of the bodies at the point of contact, which is chosen as the origin O of a system of rectangular coordinates, are denoted R and KR, where K is an order of magnitude larger than unity. The corresponding principal radii R and KR of the second body lie in a second pair of orthogonal planes that also intersect at the origin. The angle between the planes containing the equal curvatures 1/R of the two bodies is $\psi$. The plane tangent to the two bodies at the point of contact O is designated the XY plane with the X axis extending along the line of symmetry between the bodies. The Z axis is coaxial with the rotational axis of the rotor and perpendicular to the XY plane. The distance between points on the two bodies having identical coordinates x,y is consequently 2z.

1. Mechanical Restoring Torque

The conditions under which mechanical restoring torque arises may be determined and its amplitude calculated by reference to FIGS. 1-3. We observe in FIG. 1 that $C_1 = R \sin v$ and $z_1 = R(1-\cos v)$ while from FIG. 2 we see that $S = KR + z_1$, $z_2 = S - (S^2 - C_2^2)^{\frac{1}{2}}$, and $z_a = z_1 - z_2$, and FIG. 3 shows that $C_1 = X \sin\frac{1}{2}\psi$ and $C_2 = X \cos\frac{1}{2}\psi$.

Eliminating $C_1$, $z_1$, $S$, $z_2$ and $C_2$ we find that on the X axis $$z_a/R = -K + [(K + 1 - \cos v)^2 - \sin^2 v / \tan^2\tfrac{1}{2}\psi]^{\frac{1}{2}} \quad (1)$$

$$\text{where } v = \sin^{-1}\left(\frac{x}{R} \sin\tfrac{1}{2}\psi\right).$$

We can now draw the outlines of the sections of the two bodies on the X axis by means of equation (1). FIG. 4 corresponds to an angle $\psi = 90°$ between the two bodies shown in FIG. 3. As the angle $\psi$ decreases the outlines gradually broaden as shown in FIG. 5, and the curvatures at the origin become progressively less until at a limiting angle $\psi_o$ a stationary point is reached where the outlines have zero slope and no curvature at the origin. This limiting angle $\psi_o$ is determined by taking the derivative of $z_a/R$ with respect to v and equating to zero. Thus $$\cos v = \frac{k + 1}{1 + \cot^2\tfrac{1}{2}\psi} \quad (2)$$

At the origin $\cos v = 1$ and employing an identical relationship for $\cot^2\tfrac{1}{2}\psi$, we obtain $$\psi_0 = \cos^{-1}\left(\frac{K-1}{K+1}\right) \quad (3)$$

A mechanical restoring torque arises when the rotor is turned to angles less than $\psi_o$. The stationary point is forced away from the axis of rotation in accordance with equation (2) and is observed to be a point at which $z_a/R$ is a minimum with a negative sign. However, negative values of $z_a/R$ cannot exist physically because $z_a/R = O$ represents contact between the two bodies. Accordingly, the rotor is displaced axially relative to the supporting surface a distance equal to twice the absolute value of $z_a$ against a force F. The work done opposing the mechanical restoring torque $Q_m$ in turning the rotor from the angle $\psi_o$ to a smaller angle $\psi$ is $O_m(\psi_o - \psi)$ and is equal to the associated increase in potential energy $2z_aF$. Accordingly, $$O_m = 2z_a F / (\psi_o - \psi) \quad (4)$$

where $\psi$ is measured in radians. FIG. 6 shows typical outlines of the two contacting surfaces under this condition.

If we draw the graph of $z_a/R = f(\psi)$ as in FIG. 7, the mechanical restoring torque $O_m$ is proportional to the slope of the curve and is equal to the product of the slope and a proportionality constant 2FR. Although the torque $O_m$ does not appear until $\psi_o = 35.1°$ when K = 10, it rises rapidly with further decrease in the angle $\psi$ and increases without limit as $\psi$ approaches $$2\tan^{-1}\left(\frac{1}{K+1}\right),$$

which in this case is 10.4°.

2. Frictional Torque

An evaluation of the frictional torque experienced by the link suspension requires a consideration of the elastic surface deformation resulting from the pressure between the two bodies in contact. This problem is analyzed by S. Timoshenko and J. N. Goodier in "Theory of Elasticity", pages 414–417, McGraw Hill, New York, 1970.

Referring again to FIGS. 1-3, we are now only concerned with the surface of the bodies very close to the point of contact O. Under this condition $C_1$, $C_2$ and $C_3$ can be replaced by corresponding chords $c_1$, $c_2$ and $c_3$, respectively, The distances z from the XY plane can with sufficient accuracy be expressed as $z_1 = c_1^2/2R$, $z_a = z_1 - z_2$, where $z_2 = c_2^2/2KR$ and $z_b = z_1 - z_3$, where $z_3 = c_3^2/2KR$. We observe from FIG. 3 that $c_1 = X\sin\tfrac{1}{2}\psi = y \cos\tfrac{1}{2}\psi$, $c_2 = X\cos\tfrac{1}{2}\psi$ and $c_3 = y \sin\tfrac{1}{2}\psi$. Accordingly, we are in a position to calculate $z_a$ and $z_b$ and consequently z as a function of x and y. Thus $$z = Ax^2 + By^2 \qquad (5)$$

where $A = \frac{1}{4K}[(K-1) - (K+1)\cos\psi]$ and $B = \frac{1}{4K}[(K-1) + (K+1)\cos\psi]$.

Note that the derivative of z with respect to x equated to zero yields the limiting angle $\psi_o$ expressed in equation (3).

When the two bodies are pressed together a distance 2z by a force F normal to the tangent plane at O, the surface of contact will have an elliptical boundary as indicated by equation (5). The contact surface will be a plane because the contacting portions of the two bodies and their moduli of elasticity have been assumed identical.

Timoshenko and Goodier teach that the intensity of pressures p over the contact area is represented by ordinates of a semi-ellipsoid constructed on the elliptical surface of contact. The load F is therefore equal to the volume of the semi-ellipsoid. Clearly the maximum pressure p is at the center; consequently it is equal to the semiaxis coaxial with the Z axis. We can equate F to the volume of the ellipsoid $$F = \tfrac{2}{3}(\pi a b p) \text{ from which} \qquad (6)$$

$$p = \frac{3F}{2\pi ab}$$

where a and b are the semiaxes along the X and Y axes, respectively.

We must now determine the magnitudes of the semiaxes a and b, which are given by $$a = m\left[\frac{3F(1-\nu^2)}{2E(A+B)}\right]^{\frac{1}{3}} \qquad (7)$$

$$b = n\left[\frac{3F(1-\nu^2)}{2E(A+B)}\right]^{\frac{1}{3}}$$

where $\nu$=Poisson's ratio and m and n are constants that depend upon an auxiliary angle $\theta$ defined by $$\cos\theta = \frac{B-A}{A+B}.$$

Evaluating, $\theta = \cos^{-1}\left[\frac{K+1}{K-1}\cos\psi\right]$.

The calculation of m and n corresponding to a particular value of $\theta$ is complicated and involves elliptic integrals. However, the "Theory of Elasticity" on page 416 provides a table of such values. The constants m and n equal unity when $\psi=90°$, as would be expected.

In order to determine the moment arm of the frictional torque, we can consider that a quarter of the load acts at the center of pressure of each of the four octants comprising the semi-ellipsoid of pressure. The center of pressure has the same coordinates as the center of gravity of the ellipsoidal octant in the XY plane, namely $x=3a/8$ and $y=3b/8$. The moment arm r perpendicular to the axis of rotation, which is coaxial with the Z axis, is therefore $$r = \tfrac{3}{8}(a^2+b^2)^{\frac{1}{2}} \qquad (8)$$

The ratio of the frictional torque $Q_\psi$ at any angle $\psi$ relative to the frictional torque $Q_{90}$ at $\psi=90°$ is then $$Q_\psi/Q_{90} = [(m^2+n^2)/2]^{\frac{1}{2}} \qquad (9)$$

For example, given K=10 and $\psi=\pm 45°$, $\theta=30.2°$ and from the above-mentioned table m=2.73 and n=0.49; consequently $Q_{45}/Q_{90}=1.94$. We can conclude that the frictional torque varies within reasonable limits as the rotor is turned over a satisiactory range of angles.

The present invention is embodied in a link suspension permitting limited rotation of a rotor in response to a control torque, which may be either magnetically or mechanically applied to the rotor through torque coupling means fixed to a rotor armature. The simplicity of the suspension renders it suitable for use in large numbers in an array of louvers that are supported under tension only at their ends for rotation about parallel uniformly spaced coplanar axes. The louvers are preferably longitudinally resilient ribbons of high strength aluminum, which allow the plane of the array to be vertical, horizontal or inclined. It is often practicable to seal the array in the air space of a dual-glazed window or skylight.

DETAILED DESCRIPTION OF A MAGNETICALLY CONTROLLED EMBODIMENT

The magnetically controlled suspension is adapted to operate in a louver array wherein each end of every louver is attached to a separate permanent magnet rotor that is housed in a beam at the left or right side of the array. Mutual magnetic coupling between the rotors tends to maintain them in a common attitude of repose. However, the attitude of each louver is adjustable by a pair of permanent control magnets rotatable in unison, one control magnet common to all the rotors in the left beam and the other common to all the rotors in the right beam.

Figure 9A:
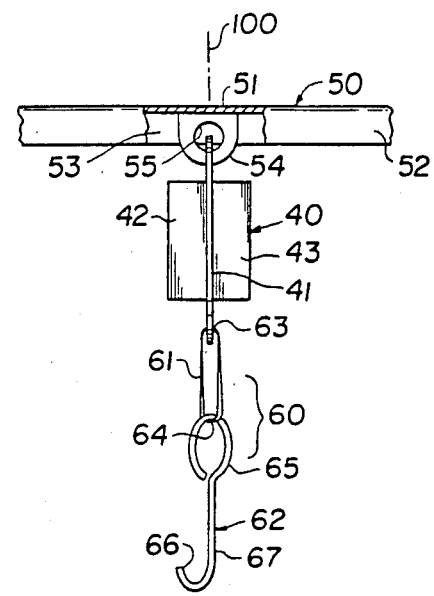
FIG. 9A is a side view of the suspension of FIG. 8A.

A typical link suspension is shown in FIGS. 8 and 9 comprising a rotor 40 having a lamellar rotor armature 41 supported by a beam cover 50 for limited rotation about an axis 100 and provided with coupling means 60 for connecting the armature to an axially tensioned louver 70.

Torque coupling means in the form of a pair of permanent rotor magnets 42 and 43 are fixed to opposite faces of the armature 41 and produce a magnetic flux perpendicular to the axis of rotation. A permanent control magnet 80 is rotatably mounted in a beam 90 in a position to be operatively related to the rotor magnets 42 and 43 when the beam cover 50 is in place.

The rotor armature 41 is an approximately rectangular plate of thin spring-temper metal provided with a pair of circular holes 44 and 45, one at each end of the plate centered on the axis of rotation. Closed slits 46 and 47 extend perpendicularly to this axis from the holes 44 and 45, respectively, to opposite outside edges of the armature 41. The rotor magnets 42 and 43 are made of rubber-bonded barium ferrite flat strips having a high tack, pressure sensitive adhesive layer on the surface in cntact with the armature 41. The magnets 42 and 43 extend axially between the inner edges of the holes 44 and 45 and have a width coextensive with the armature. The thickness of each magnet is approximately one half its width; consequently the cross section of the rotor perpendicular to the axis 100 of rotation is substantially square.

The beam cover 50 comprises a thin spring-temper elongated metal strip 51 having parallel edges bent at right angles to the strip 51 to form stiffening lips 52 and 53. A tab 54 containing a circular hole 55 projects perpendicularly from the strip toward the rotor armature 41. The tab 54 aligns with the longitudinal centerline of the strip 51 and is conveniently formed by slitting the strip 51 in approximately a semicircular outline and bending the slit portion about the longitudinal centerline. The hole 44 in the armature 41 is linked to the hole 55 in the tab 54, access being obtained by momentarily springing open the slit 46. This operation is facilitated by a notch 48 at the outside edge of the slit 46.

The coupling means 60 comprises a metal connecting loop 61 linked to a louver fastener 62 of bent wire. The loop 61 has an elongated oval shape with narrow parallel sides joined at either end by identical tight return bends 63 and 64. The return bend 63 is hung on the circumference of the armature hole 45 after the slit 47 is sprung open to give access. The return bend 64 supports a circular eye 65 of the louver fastener 62. The connecting loop 61 is sufficiently torsionally rigid to transmit rotation of the armature 41 to the eye 65. A permanent twist is formed in the connecting loop 61 to provide a desired angular relationship between the plane of the armature 41 and the plane of the eye 65.

Figure 8B:
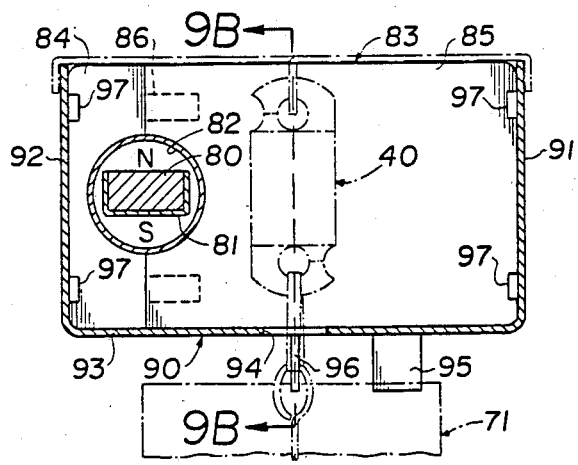
FIG. 8B is a cross-sectional view of a beam for housing the rotor of FIG. 8A in operative relationship to a rotatable permanent control magnet.
Figure 9B:
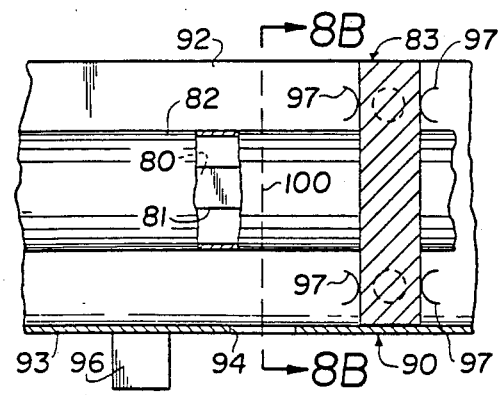
FIG. 9B is a side view of the beam of FIG. 8B with portions broken away to reveal the control magnet.

Referring particularly to FIGS. 8B and 9B, the beam 90 is a channel of sheet steel having a rectangular U-shaped cross section comprising parallel flanges 91 and 92 separated by a web 93. A circular hole 94 centered on the longitudinal centerline of the beam 90 perforates the web 93. The diameter of the hole 94 is sufficient to allow passage of the eye 65 of the fastener 62. A louver opening limit stop 95 and a closing limit stop 96 are provided for the louver 70 in the form of rectangular tabs slit and bent from the web 93. The stop 96 is located on the longitudinal centerline of the beam midway between the rotational axes 100 of adjacent louvers. The stop 95 lies on a radius projected from the center of the hole 94 that is horizontal when the beam 90 is installed in its final position in a building. The stops 95 and 96 force the louvers to assume a uniform horizontal or a uniform closed attitude at the extremities of the rotation of each louver.

The permanent control magnet 80 is a continuous long strip of rubber-bonded barium ferrite having a rectangular cross section that is uniformly magnetized through its thickness dimension. The magnet 80 is protected by a channel 81 of non-magnetic material and is inserted into a thin-walled cylindrical aluminum tube 82. The tube 82 extends the full length of the beam 90 past all the permanent magnet rotors 40 (not shown) and is supported where needed by bearings. A typical bearing 83 is a rectangular partition of plastics material having a low frictional coefficient. The bearing 83 extends transversely across the interior of the beam 90 and is fixed in position midway between adjacent rotor axes by dimples 97 projecting from the inside surfaces of the flanges 91 and 92. The bearing 83 is split into two parts 84 and 85 to provide two halves of a cylindrical bushing loosely surrounding the tube 82. Dowels 86 maintain the parts 84 and 85 in alignment.

Figure 8C:
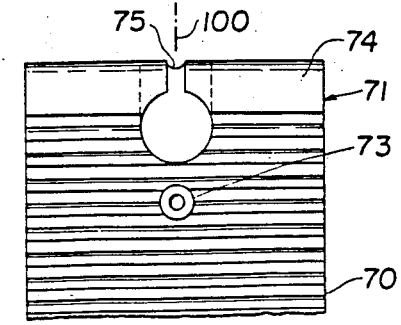
FIG. 8C is a plan view of a longitudinally resilient louver, which is a source of tension for the rotor of FIG. 8A to which it attaches when the three component parts of FIGS. 8A, 8B and 8C are/assembled.
Figure 9C:
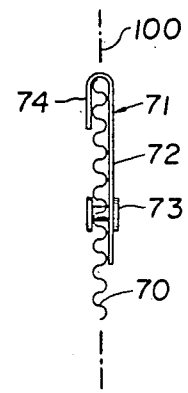
FIG. 9C is an edge view of the louver of FIG. 8C.

Referring now to FIGS. 8C and 9C, the louver 70 is made of a corrugated ribbon of spring-temper, high-strength aluminum foil. The axes of the corrugations extend parallel to the width of the louver to stiffen the louver transversely and to render it longitudinally resilient. An analysis of this type of louver is contained in U.S. Pat. No. 3,342,244, granted Sept. 19, 1967.

A louver terminal 71 protects the end of the louver 70 and provides means for attaching the eye 65 of the fastener 62 to the louver 70. The terminal 71 has a rectangular flat plate portion 72, which is secured against a face of the louver 70 by an eyelet 73 centered on the rotational axis, and a narrow transverse rim 74 formed by a U-bend, which extends from the plate portion around the extreme transverse edge of the louver. The end of the louver nests within the rim 74 except adjacent the rotational axis where the rim 74 and the louver 70 are cut away by notches 75 and 76, respectively, sufficientl to accomodate the connecting loop 61 and to permit the eye 65 to lie parallel to and against the plate portion 72.

Assembly of the beam cover 50, beam 90 and louver 70 is facilitated by the provision of a hook 66 at the end of a shank 67 attached to the eye 65 of the louver fastener 62. A fixture (not shown) holds the rotor armature 41 on the axis of rotation 100 until the hook 66 projects through th hole 94 and can be gripped. The fixture is then withdrawn, and the cover 50 is placed against the beam 90 with the lips 52 and 53 overlapping the flanges 91 and 92, respectively. The cover 50 is temporarily deflected toward the interior of the beam 90 until the rotor armature 41 contacts the inside of the web 93. This deflection provides adequate clearance between the eye 65 and the outside of the web 93 to permit the eye to be received in the notch 76 of the louver and slid into the pocket formed by the rim 74. Releasing the inward deflection of the cover 50 draws the terminal 71 of the now attached louver 70 sufficiently close to the web 93.

The metal thickness of the beam cover 50 and the rotor armature 41 is necessarily greatly exaggerated in the drawings. A typical suspension employs contacting surfaces each having a width of about 0.2 mm. The bearing characteristics are improved by using dissimilar metals. The cover 50 may be made of stainless steel and the armature 41 may be of beryllium copper, both tempered to very high tensile strength. The edges of the contacting surfaces are fully rounded to give convexity parallel to the narrow dimension, and all burr removed by suitable shot peening.

DETAILED DESCRIPTION OF A MECHANICALLY CONTROLLED EMBODIMENT

The link suspension can be mechanically controlled by a crank and connecting rod, but this type of mechanism is unsatisfactory where 180 degrees of rotation are desired. In order to avoid dead centers, a follower member in the form of a spur gear is fixed to the rotor, and a rack serves as a driver member.

Referring to FIGS. 10-13, a rotor 140, holding a louver 70 under tension, is rotatably supported by an oval link 150 that is hung on a saddle portion 152 of a toggle fastener 151 mounted on a beam 190. A spur gear 146, which is fixed to a lamellar armature 141 of the rotor140 engages a rack 180 contained in the beam 190. The rack 180 is adapted to slide along the beam in response to rotation of a shaft 188 located at one end of the beam to turn the rotor 140 and hence the louver 70.

The rotor armature 141 is a thin plate of high-strength metal having a plane of symmetry that intersects the rotational axis 100. An integral hook 143 having a centerline of curvature perpendicular to and intersecting the axis 100 extends across one end of the armature 141. Approximately half way along its length the armature 141 is reduced in width by a pair of shoulders 142, and the end opposite the hook 143 is terminated in a semicircular edge 147 centered on the axis 100. A tab 145 is lanced perpendicularly from the armature leaving a semicircular hole 144 concentric with the edge 147. The periphery of the hole 144 is rounded, as by shot peening, to provide a suitable surface to be rotatably supported by by the inner circumference of the link 150.

The link 150 is made of high-strength round wire formed into identical semicircular return bends. The centers of the return bends lie on the axis 100 and are spaced slightly apart to produce an oval shape. The diameter of the bends is an order of magnitude larger than the diameter of the wire. Access to the interior of the link 150 is provided between overlapping ends of the wire intermediate the return bends. The link 150 is itself rotatably suspended on the shoulder portion 152 of the toggle fastener 151 to provide a second link suspension.

Figure 10:
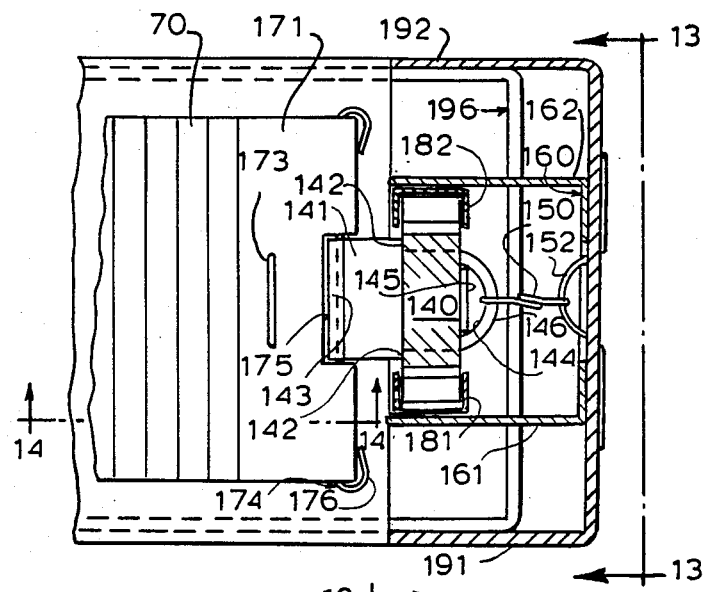
FIG. 10 is a cross section of a link-suspended rotor armature, which supports a louver and carries a spur gear that is driven by a rack, taken along dashed lines 10—10 of FIG. 12.
Figure 11:
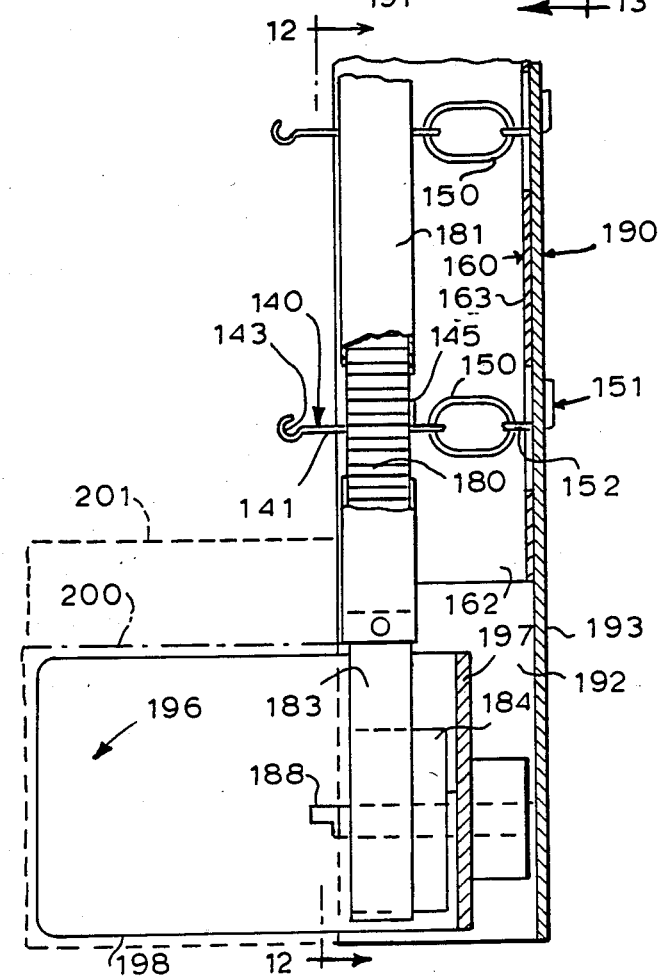
FIG. 11 is a elevational section taken along lines 11—11 of FIG. 12 showing rotors after assembly in a beam and before attachment of louvers.

The toggle fastener 151, shown particularly in FIGS. 10 and 13, is made of high-strength wire of circular cross section. The saddle portion 152 is an arcuate offset centered in an otherwise straight shank connecting terminal hooks 153 and 153' that lie flat against the outer face of a web 193 of the beam 190. The saddle portion 152 is centered on the axis 100 by an aperture 194 in the web 193 and extends through the web into the interior of the beam 190.

The beam 190 is made of sheet steel and has parallel flanges 191 and 192 that form with the web 193 a U-shaped channel opening toward the louver 70. The beam may be mounted on an existing structure, such as the well of a skylight. Alternatively, it may form part of a self-supporting frame comprising a pair of opposing beams and intervening struts. One such strut 200 and associated light-shielding fin 201 are indicated by phantom lines in FIGS. 10 and 11. A typical U-shaped corner connector 196 having a base 197 and parallel legs 198 and 199 is attached at the end of the beam 190. The legs 198 and 199 are spaced and dimensioned to slide snugly into the interior of the strut 200 when end of the strut abuts the beam after the rotors have been mounted in the latter.

The louver 70, shown in FIGS. 10 and 14, is provided with an end cover 171 to facilitate attachment to the rotor. The end cover 171 comprises a rectangular sheet of material, which has a width equal to that of the louver, folded double to envelop the end of the louver and to protect the adjacent louver surfaces. A staple 173 penetrates the doubled thickness of the cover 171 and the louver 70 sandwiched therebetween to fasten them together. A rectangular notch 175 centered on the longitudinal axis of the louver is removed from the fold portion of the cover 171. A terminal wire 174 having a circular cross section lies in this fold portion and extends across the front of the notch 175. The wire 174 projects somewhat beyond the width of the cover 171 and is clamped in place by return bends 176 that bear against the outside of the fold portion of the cover. The dimensions of the notch 175 just accomodate the hook 143 of the rotor armature 141 and permit the terminal wire 174 to lodge snugly in the hook.

Now directing attention to the means for mechanically controlling the rotation of the rotor 140, FIGS. 10 and 12 show the spur gear 146 mounted on the armature 141. Assembly is effected by temporarily flattening the tab 145 into the hole 144 from which it was originally lanced, sliding the armature 141 through a centralized axial slot in the gear 146 until the shoulders 142 abut one side of the gear, and then relancing the tab 145 to bear against the opposite side of the gear. The gear 146 is molded or extruded from plastic material, preferably one having a low coefficient of friction.

The rack 180 that engages the spur gear 146 is made of a thin narrow strip of steel roll-formed and/or stamped into suitable teeth profiles. The rack 180 is retained in a U-shaped guide channel 181 that has a web to which the roots of some or all of the teeth are welded. The channel 181 has parallel flanges that extend with a sliding fit on either side of the gear teeth to maintain the rack 180 in axial alignment with the gear 146.

The teeth of the gear 146 that are diametrically opposite the teeth engaging the rack 180 nest in a guide channel 182 similar to and parallel with the channel 181. Channels 181 and 182 are interconnected by a belt 183 and a pulley 184 at one end of the beam 190 and a belt 185 and a pulley 186 at the opposite end of the beam. The pulley 184 is mounted on the shaft 188; consequently rotation of the latter by manual adjustment or automatic control (not shown) moves the guide channel 181 and attached rack 180 in one direction and the channel 182 an equal distance in the opposite direction, turning the spur gear 146 therebetween. The weight of the channel 182 approximately balances the weight of the channel 181 and rack 180. The temperature coefficients of expansion of the beam 190 and the rack 180 are identical, accordingly the angular position of the gear 146 is independ of the static ambient temperature.

A backstop channel 160 is provided to limit the radial displacement of the guide channels 181 and 182 relative to the gear 146. A web 163 of the channel 160 is attached to the interior of the beam web 193 and backstop flanges 161 and 162 extend parallel to and coextensive with adjacent beam flanges 191 and 192, respectively. The flanges 161 and 162 make a sliding fit with the guide channels 181 and 182, respectively, without limiting axial movement of the rotor 140.

Mounting the rotor 140 in the beam 190 is facilitated by placing the beam web 193 in a horizontal attitude. The rotor is then held with its axis of rotation centered vertically above the open beam with the link 150 hanging down and the toggle fastener 151 suspended therefrom by the terminal hook 153 or 153'. The guide channels 181 and 182 are next slipped over the teeth of the gear 146, and the assembly slid downward between the backstop flanges 161 and 162 until the toggle fastener 151 passes entirely through the aperture 194 in the beam web 193, and a sufficient portion of the link 150 appears on the exterior of the web to permit half the length of the fastener 151 to be pushed across the aperture 194 while threading the link 150. At this point the saddle portion 152 is reached, causing the toggle fastener to rotate 90 degrees as the saddle portion 152 enters the aperture and frees the link 150 to assume its operative position within the beam 190.

The belts 183 and 185, which are allowed to slide axially on the respective pulleys 184 and 186 while the rotor 150 is being mounted in the beam 190, can now take their final positions. A pin 187 through the belt 183 fixes the angle of the pulley 184 relative to the angle of the rotor armature 141.

I claim:

1. A link suspension permitting limited rotation of a rotor in response to a control torque, comprising a supporting member having an anticlastic supporting surface, a rotor having an anticlastic supported surface, torque coupling means fixed to said rotor, and a louver connected under tension to said rotor and holding said surfaces in contact, the radius of convexity along a transverse plane section of each of said surfaces being at least an order of magnitude smaller than the radius of concavity along a longitudinal plane section of the respective surface.

2. A link suspension according to claim 1 wherein the rotor comprises a thin plate, and the supported surface is provided by a rounded periphery of a hole adjacent an edge of said plate.

3. A link suspension permitting limited rotation of a rotor in response to a driver member, comprising a supporting member providing an anticlastic supporting surface, a lamellar rotor armature having a hole with a rounded periphery providing an anticlastic supported surface, the radius of convexity along a thickness section of each surface being at least an order of magnitude smaller than the radius of concavity along a width section of the respective surface, a follower member fixed to said armature and coupled to said driver member, and a longitudinally resilient ribbon louver connected under tension to said armature and holding said surface in contact.

4. A link suspension according to claim 3 wherein said driver member is a rack, said follower member is a spur gear, and said supporting member is a link of wire having a circular cross section.

* * * * *